(12) United States Patent  
Oldenzijl et al.

(10) Patent No.: US 12,501,519 B2  
(45) Date of Patent: Dec. 16, 2025

(54) POSITIVE TEMPERATURE COEFFICIENT COMPOSITION

(71) Applicant: HENKEL AG & CO. KGAA, Duesseldorf (DE)

(72) Inventors: Rudolf Warmold Oldenzijl, Hoogezand (NL); Stijn Gillissen, Hasselt (BE); Gunther Dreezen, Balen-Olmen (BE)

(73) Assignee: Henkel AG & Co. KGaA, Duesseldorf (DE)

( * ) Notice: Subject to any disclaimer, the term of this patent is extended or adjusted under 35 U.S.C. 154(b) by 920 days.

(21) Appl. No.: 15/596,361

(22) Filed: May 16, 2017

(65) Prior Publication Data

US 2017/0257910 A1     Sep. 7, 2017

Related U.S. Application Data

(63) Continuation of application No. PCT/EP2015/076690, filed on Nov. 16, 2015.

(30) Foreign Application Priority Data

Nov. 17, 2014   (EP) .................................... 14193525

(51) Int. Cl.
  *H05B 3/14*      (2006.01)
  *H01C 7/02*      (2006.01)
  (Continued)

(52) U.S. Cl.
  CPC ............. *H05B 3/146* (2013.01); *H01C 7/027* (2013.01); *H01C 7/028* (2013.01);
  (Continued)

(58) Field of Classification Search
  CPC .... H01C 7/027; H01C 7/028; H01C 17/0651; H01C 17/06586; H05B 2203/02; H05B 3/146; H02H 9/026
  (Continued)

(56) References Cited

U.S. PATENT DOCUMENTS 3,760,495 A * 9/1973 Meyer ...................... H01B 1/22  
  219/222  
4,277,542 A   7/1981 Boonstra et al.  
(Continued)

FOREIGN PATENT DOCUMENTS

CN       1218266 A    6/1999  
CN       1244716 A    2/2000  
(Continued)

*Primary Examiner* — Edward F Landrum  
*Assistant Examiner* — Kuangyue Chen  
(74) *Attorney, Agent, or Firm* — Steven C. Bauman

(57) ABSTRACT

The present invention relates to a positive temperature coefficient composition comprising a semi-crystalline material, at least one binder, from 0.5 to 9.5% by weight of an electronically conductive material and a solvent. Furthermore, the present invention relates to use of a positive temperature coefficient composition according to the present invention in heating elements and sensors. A positive temperature coefficient composition according to the present invention provides low and stable resistance till self-regulating temperature, which allows fast heating of the heating element. Furthermore, the positive temperature coefficient composition according to the present invention has high PTC ration and therefore, has higher safety and more power can be applied to the heating element.

13 Claims, 7 Drawing Sheets

(51) Int. Cl.
 *H01C 17/065* (2006.01)
 *H02H 9/02* (2006.01)

(52) U.S. Cl.
 CPC ....... *H01C 17/06586* (2013.01); *H02H 9/026* (2013.01); *H01C 17/06513* (2013.01); *H05B 2203/02* (2013.01)

(58) Field of Classification Search
 USPC ........................................................ 219/202
 See application file for complete search history.

(56) References Cited

U.S. PATENT DOCUMENTS

| | | | | |
|---|---|---|---|---|
| 4,293,514 | A * | 10/1981 | Wada | C04B 35/4682 |
| | | | | 264/209.1 |
| 5,993,698 | A * | 11/1999 | Frentzel | H01C 7/028 |
| | | | | 252/511 |
| 6,660,795 | B2 | 12/2003 | Blok | |
| 9,627,722 | B1 * | 4/2017 | Fan | H01M 10/4235 |
| 2001/0005562 | A1 * | 6/2001 | Yoshioka | H01M 2/0272 |
| | | | | 429/185 |
| 2008/0039575 | A1 | 2/2008 | Mercx | |
| 2008/0304797 | A1 * | 12/2008 | Castellani | C08L 23/06 |
| | | | | 385/100 |
| 2009/0170006 | A1 * | 7/2009 | Abe | H01M 10/0525 |
| | | | | 429/326 |
| 2013/0193384 | A1 | 8/2013 | Dorfman | |
| 2014/0345843 | A1 * | 11/2014 | Kirkor | F28F 23/00 |
| | | | | 165/185 |

FOREIGN PATENT DOCUMENTS

| | | |
|---|---|---|
| CN | 1790557 A | 6/2006 |
| CN | 102105948 A | 6/2011 |
| CN | 102532669 A | 7/2012 |
| CN | 105073493 A | 11/2015 |
| EP | 2193171 B1 | 7/2011 |
| JP | 61-40360 A | 2/1986 |
| JP | 4-500694 A | 2/1992 |
| JP | 2000082602 A | 3/2000 |
| JP | 2000223303 A | 8/2000 |
| JP | 2001-210140 A | 8/2001 |
| WO | 2008021768 A1 | 2/2008 |

* cited by examiner

POSITIVE TEMPERATURE COEFFICIENT COMPOSITION

TECHNICAL FIELD OF THE INVENTION

The present invention relates to a positive temperature coefficient composition. The composition according to the present invention has low and stable resistance until the self-regulating temperature, which means rapid heating of the heating element. Furthermore, the composition according to the present invention has high PTC ratio providing improved safety and more power can be applied to the printed heating element.

BACKGROUND OF THE INVENTION

'Positive Temperature Coefficient' or 'PTC' materials are conductive materials characterized by a sharp increase in resistivity upon reaching a switching temperature (Ts). A function/curve of the electrical resistivity with temperature has a positive slope and within this temperature range, the electrically conducting polymeric PTC composition is said to have a positive coefficient of temperature resistance (PTCR). If the jump in resistivity is sufficiently high, the resistivity effectively blocks the current and further heating of the material such as overheating of the material is prevented. One of the main benefits of PTC materials is that no additional electronic circuits are necessary in an article that comprises a PTC material, since the PTC material itself has a characteristic similar to electronic circuits. Moreover, upon cooling, the PTC material resets itself. This jump in resistivity may often be referred to as the PTC amplitude and may be defined as the ratio of the maximum volume resistivity to the volume resistivity at room temperature (approximately 23° C.).

In recent years, PTC polymer materials have been widely used for example in self-limiting heating cables and over-current protection devices. In addition, PTC materials have been utilized in self-controlled heaters. When connected to a power source, the PTC material will heat up to the trip temperature and maintain this temperature without the use of any additional electronic controllers. Furthermore, due to the extensive development, application and dissemination of electronic products, such as computers, smart phones etc. has increased the need for over-current protection devices. Compositions exhibiting PTC behavior have also been used in the electrical devices as over-current protection in electrical circuits comprising a power source and additional electrical components in series. In the electrical circuit, under normal operating conditions, the resistance of the load and the PTC device is such that relatively little current flows through the PTC device. Thus, the temperature of the device remains below the critical or trip temperature. If the load is short circuited or the circuit experiences a power surge, the current flowing through the PTC device increases greatly. At this point, a large amount of power is dissipated in the PTC device. This power dissipation only occurs for a short period of time (fraction of a second). However, the temperature of the PTC device will raise to a value where the resistance of the PTC device has become so high, that the current is limited to a negligible value. The device is said to be in its "tripped" state. Although, the negligible or trickle through current that flows through the circuit will not damage the electrical components which are connected in series with the PTC device. Thus, the PTC device acts as a form of a fuse, reducing the current flow through the short circuit load to a safe, low value when the PTC device is heated to its critical temperature range. Upon interrupting the current in the circuit, or removing the condition responsible for the short circuit (or power surge), the PTC device will cool down below its critical temperature to its normal operating, low resistance state. The effect is a resettable, electrical circuit protection device.

Therefore, it can be said that, the PTC inks are beneficial because of their self-regulating and fast heating properties. A less conductive PTC ink will always give a higher PTC ratio, which brings more safety, however, it will also generate less initial power (Power (W)=$V^2$/R, higher R means less power). Typically, the resistance of a PTC material already starts to increase a little when the temperature goes up.

Various materials have been developed that show these characteristics. Among them are ceramics as well as polymer based PTC materials. There is PTC technology available, however, especially PTC inks are not that readily yet available.

In the past industry has tried to increase the PTC ratio by using different ratios of carbon and/or graphite materials. This has provided some improvement to the physical properties and safety, but the improvements have not been sufficient.

One attempt to improve PTC technology has been to add synthesized semi-crystalline polymer, which also has a high PTC ratio into a PTC composition. Semi-crystalline polymer is providing an improvement over the existing materials.

Therefore, there is still room for an improvement in the PTC ratio and this way more power can be applied to provide a fast heating without overruling the safety of self-regulation.

SUMMARY OF THE INVENTION

Figure 1:
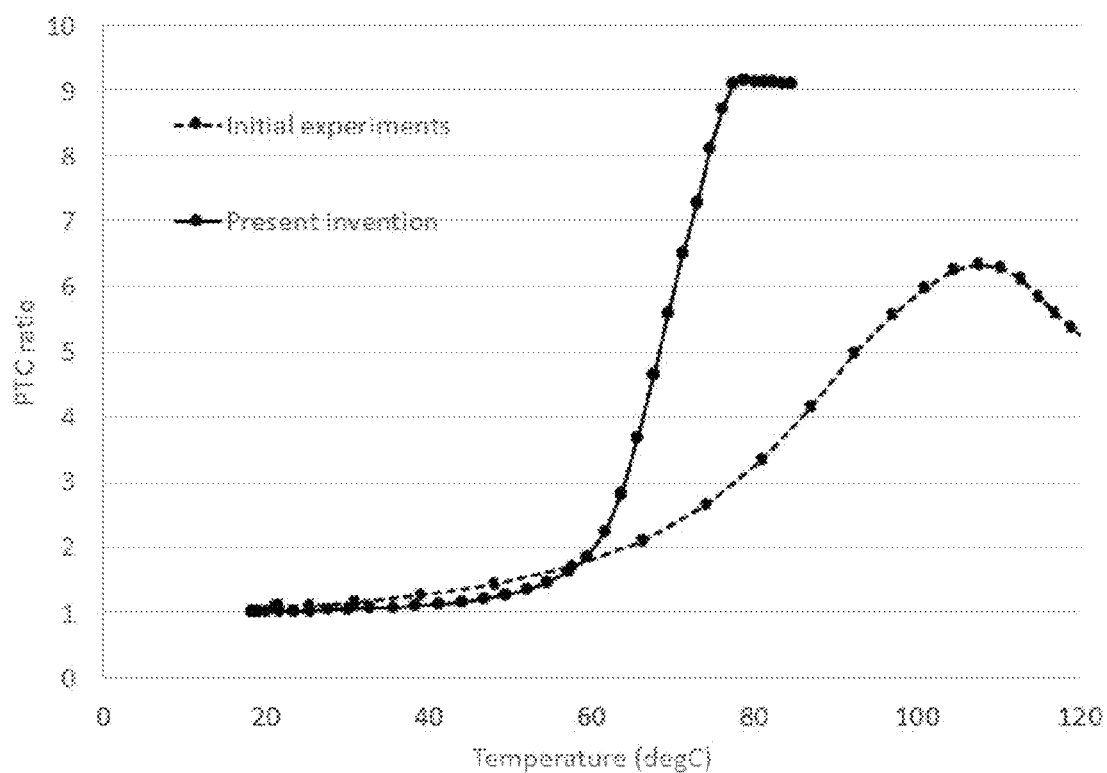
FIG. 1 illustrates the PTC curve for the composition according to the present invention and in comparison the PTC curve of the material described in the prior art.

The present invention relates to a positive temperature coefficient composition comprising a semi-crystalline material, at least one binder, from 0.5 to 9.5% by weight of an electronically conductive material and a solvent.

In addition, the present invention relates to use of a positive temperature coefficient composition according to the present invention in heating elements and sensors.

The present invention also encompasses an article comprising a positive temperature coefficient composition according to the present invention, wherein said article is selected from the group consisting of self-controlled heaters; over-current protection devices; air conditioning units; automotive applications selected from the group consisting of heated seats, heated mirrors, heated windows, heated steering wheels; circuit protection devices; perfume dispensers; sensors.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical end points includes all numbers and fractions subsumed within the respective ranges, as well as the recited end points.

When an amount, a concentration or other values or parameters is/are expressed in form of a range, a preferable range, or a preferable upper limit value and a preferable lower limit value, it should be understood as that any ranges obtained by combining any upper limit or preferable value with any lower limit or preferable value are specifically disclosed, without considering whether the obtained ranges are clearly mentioned in the context.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

The present invention provides a positive temperature coefficient composition comprising a semi-crystalline material, at least one binder, from 0.5 to 9.5% by weight of an electronically conductive material and a solvent.

The present invention does eliminate or improve above-mentioned drawbacks. The PTC composition according to the present invention has relatively good conductivity at room temperature (between 1-2 kOhm/sq/25 µm) which provides a lot of heating power when the voltage is applied. This means that the heating element has a very fast response time and will heat up very fast. The resistance remains low, even when the temperature goes up and thus heating happens very quickly. The compositions according to the present invention have a high PTC ratio, so they can still suppress the high-generated power and give a very quick self-regulation.

The positive temperature coefficient composition according to the present invention provides low and stable resistance until the self-regulating temperature, which means rapid heating of the heating element. High PTC ratio in the composition increases safety—under similar circumstances a PTC ink with a high PTC ratio is safer than a PTC ink with a lower PTC ratio. Voltage spikes will not cause overheating and/or burning of the heating element. In addition, more power can be applied to the printed heating element, which increases the number of applications.

The PTC compositions according to the present invention have a resistance, which hardly increases with increasing temperature until an onset point has been reached. When the set point has been reached the resistance increases sharply. The initial low resistance allows a higher heat power generation. The voltage is typically a constant number and the generated power is calculated from the equation $W=V^2/R$. At some point the material gives a very steep resistance increase, this is where the self-regulation kicks in and from this point on the heater power is suppressed.

The so-called PTC ratio is the maximum resistance divided by the resistance at room temperature. A composition with a low PTC ratio cannot withstand a very high input power. If a lot of voltage is applied, also a lot of heat will be generated, subsequently the ink composition melts and the safety is overruled. A high PTC ratio means that with a lot of input power, the resistance at the self-regulating temperature is still high enough to supress the power and create an equilibrium. Therefore, the system remains safe and will not overheat.

FIG. 1 Illustrates the PTC curve for the composition according to the present invention and in comparison the PTC curve of the material according to initial developments described in the prior art, wherein the active material used was ethylene vinyl acetate copolymer. The PTC curve of the initial developments shows that the resistance starts to increase at 40° C. and reaches a maximum around 110° C. The PTC curve of the composition according to the present invention illustrates that resistance starts to increase around 60° C. and reaches a maximum around 80° C.

The positive temperature coefficient composition according to the present invention is free from any halogen containing material. By the term free of any halogen containing material is meant that composition comprises halogen ions less than 0.1% by weight of the total weight of the composition, preferably less than 0.01%.

Each of the essential components of the positive temperature coefficient composition according to the present invention are described in details below.

Semi-Crystalline Material

A positive temperature coefficient composition according present invention comprises a semi-crystalline material. Semi-crystalline material can also be referred as an active material in the PTC composition.

Semi-crystalline polymers exhibit significant volume increases via phase transitions at certain temperatures, and this enables these polymers to have the unique capability of "off-on" control, i.e., a "temperature switch". These semi-crystalline polymers are crystalline below the "temperature switch" and amorphous above it.

Semi-crystalline material suitable for use in the present invention is prepared by conventional means known by the skilled person.

It is preferred that the semi-crystalline material used in the present invention has a high enthalpy, and a narrow melting peak. These features are required to formulate a desired PTC Ink with high PTC ratio. For example material, which has a high enthalpy, but at the same time has a broad melting peak, the resistance increases "early" and slowly, there is no rapid heating, no rapid shut down of the system and the PTC ratio is low.

Suitable, and preferred semi-crystalline material to be used in the present invention has a melt enthalpy greater than 150 J/g according to ASTM E793.

For example, example 4 in the experimental section exemplify a very good semi-crystalline material. Composition of example 4 has a high melt enthalpy together with a narrow melt peak. This gives no resistance increase in the beginning, but rapid heating. Followed by a very quick melting, and a very sharp increase in resistance and a high PTC ratio. This is possible because of the high melt enthalpy and a narrow melting peak of the semi-crystalline material.

Suitable semi-crystalline material to be used in the present invention has preferably narrow melt peak as determined by DSC. Preferably on- and off-set temperatures for melting should differ maximum by 20° C. from the melting point.

Furthermore, suitable semi-crystalline material to be used in the present invention has preferably a low molecular weight and narrow melting point range. Low molecular weight allows semi-crystalline material to respond faster to temperature changes.

In one preferred embodiment, the semi-crystalline material has a degree of crystallinity of at least 5%. In another preferred embodiment, the semi-crystalline thermoplastic material has a degree of crystallinity of at least 10%. In still another preferred embodiment, the semi-crystalline thermoplastic material has a degree of crystallinity of at least 15%.

The semi-crystalline material is selected from the group consisting of polyethylene, polypropylene, polyvinyls, nylon, polyethylene terephthalate, polybutylene terephthalate, polyoxymethylene, natural polymers, hydrocarbon waxes, modified alkyl acrylate polymers and mixtures thereof. Preferably, hydrocarbon waxes comprise more than 95% alkane, mainly normal paraffin with straight chains and are fully saturated. Preferably, the semi-crystalline material is selected from the group consisting of natural polymers and hydrocarbon waxes.

Suitable commercially available semi-crystalline material to be used in the present invention is for example Dilavest P86 from Paramelt.

A positive temperature coefficient composition according to the present invention comprises a semi-crystalline material from 0.5 to 70% by weight of the total composition, preferably from 20 to 60%, more preferably from 25 to 45% and most preferably from 23 to 35%.

A Binder

A positive temperature coefficient composition according present invention comprises at least one binder. The binder used in the PTC composition may be selected from any binder currently used in the industry.

In general, at least one binder is selected from the group consisting of thermoplastic polyurethanes, polyesters, polyacrylates, polysiloxanes, halogenated vinyl or vinylidene polymers, polyamide copolymers, phenoxy resins, polyethers, polyketones, polyvinyl butyral, polyvinyl pyrrolidone, polyacrylates and mixtures thereof. Preferably, at least one binder is selected from the group consisting of thermoplastic polyurethanes.

The thermoplastic polyurethanes are preferred binders because they provide good adhesion and flexibility and they do not interfere with the mechanical integrity of the film.

In one embodiment, the positive temperature coefficient composition according present invention comprises at least two binders. In this embodiment, the first binder is selected from the group consisting of thermoplastic polyurethanes, polyesters, polyacrylates, polysiloxanes, halogenated vinyl or vinylidene polymers, polyamide copolymers, phenoxy resins, polyethers, polyketones, polyvinyl butyral, polyvinyl pyrrolidone, polyacrylates and mixtures thereof, and the second binder is selected from the group consisting of ethylene vinyl acetate polymers, poly vinyl alcohol, ethylene alkyl acrylate copolymers and mixtures thereof.

In preferred embodiment the first binder is thermoplastic polyurethane and the second binder is ethylene vinyl acetate. In this embodiment, the second binder is used to improve the printability of the composition.

Suitable commercially available binder material to be used in the present invention are for example Estane 5715 from Lubrizol and Elwax 40W from Du Pont.

A positive temperature coefficient composition according to the present invention comprises at least one binder from 0.5 to 8.5% by weight of the total weight of the composition, preferably from 2.5 to 7.5% and more preferably from 4 to 6%.

A positive temperature coefficient composition according to the present invention comprises at least two binders from 1 to 10% by weight of the total weight of the composition, preferably from 3.5 to 10% and more preferably from 5.75 to 8.25%.

The current binder quantity in the composition according to the present invention is ideal, because higher quantities would interfere negatively with the PTC ratio. In addition, lower levels than 0.5% by weight of the total weight of the composition would decrease the adhesion properties and the PTC ratio.

An Electronically Conductive Material

A positive temperature coefficient composition according present invention comprises an electronically conductive material. Suitable electronically conductive material is for example metal powders and carbon black. Carbon black is one material that has been used in PTC materials. Carbon black is one of the most frequently used conductive fillers for polymer based PTC materials. Some of the advantages of using carbon black as compared to electronically conductive metal materials include a lower cost price and a lower density.

The preference of the electronically conductive material depends on the application. For example if certain resistance levels are required, combination of carbon black and graphite is preferred electronically conductive material. On the other hand, for the materials which require more conductivity, the electronically conductive material, which is more conductive, like silver or metal alloys, can be used and are preferred.

In general, the electronically conductive material is selected from the group consisting of silver, nickel, carbon, carbon black, graphite, graphene, copper, silver coated copper, silver coated graphite, gold, platinum, aluminum, iron, zinc, cobalt, lead, tin alloys and mixtures thereof. Preferably, the electronically conductive material is selected from the group consisting of graphite, carbon black and mixtures thereof.

Suitable commercially available electronically conductive material to be used in the present invention are for example Ensaco 250G from Timcal and Vulcan XC72R from Cabot Corporation.

In one particularly preferred embodiment, the composition according to the present invention comprises graphite particles in combination with the carbon black. The graphite particles show an improved thermal conductivity, which can prevent the formation of hot spots in operation, i.e. when connected to a power source. In addition, the combination of carbon black and graphite is preferred because this particular blend gives the desired resistance levels. Furthermore, this particular combination also provides desired high PTC ratio.

Preferably, said electronically conductive material has a d50 particle size from 5 µm to 6.5 µm and more preferably about 5.9 µm. Preferably, said electronically conductive material has a d90 particle size from 11.5 µm to 13 µm and more preferably about 12 µm.

Preferably, said electronically conductive material has a particle surface area from 60 to 70 m$^2$/g and more preferably about 68 m$^2$/g.

A positive temperature coefficient composition according to the present invention comprises electronically conductive material from 0.5 to 9.5% by weight of the total weight of the composition, more preferably from 4.5 to 8% and most preferably from 6 to 8%.

The current electronically conductive material quantity in the composition according to the present invention is ideal, because higher quantities would provide too high conductivity and therefore, would decrease the PTC ratio. On the other hand, quantities below 0.5% would provide high PTC ratio, however, material would not be conductive enough.

Solvent

A positive temperature coefficient composition according present invention comprises a solvent. A wide variety of known organic solvents can be used in the present invention. Suitable solvents to be used in the present invention preferably have a flashpoint high enough to make the ink screen printable without the ink drying on the screen. Preferably the flash point of the solvent is from 70 to 120° C.

It is also preferred that the solvents used in the present invention preferably also dissolve the additional binders and compatibilizers.

Suitable solvent to be used in the present invention is selected from the group consisting of alcohols, ketones, esters, glycol esters, glycol ethers, ethers and mixtures thereof. Preferably solvent is selected from butyl glycol acetate, carbitol acetate and mixtures thereof.

Suitable commercially available solvents to be used in the present invention are for example butyl glycol acetate and carbitol acetate from Eastman.

A positive temperature coefficient composition according to the present invention comprises a solvent from 5 to 80% by weight of the total weight of the composition, preferably from 10 to 70% and more preferably from 13 to 63%.

Ideal quantity of the solvent in the PTC composition according to the present invention depends on the application. For example, if the ink is used in the screen printing, the solvent level is higher in order to gain ideal viscosity for screen printing.

Optional Ingredients

In addition to above mentioned ingredients a positive temperature coefficient composition according to the present invention may further comprise additional ingredients selected from the group consisting of dispersants, wetting agents, compatibilizers, levelling agents and mixtures thereof.

Preferably, the positive temperature coefficient composition according to the present invention has a Hegman value less than 40. Hegman value indicates the maximum particle size still in the formulation. The Hegman value depends on how the positive temperature coefficient composition is prepared.

Preferably, the positive temperature coefficient composition according to the present invention has a viscosity from 5 to 45 Pas (15 s$^{-1}$) measured on a rheometer AR 1000 at constant shear rate with 20 mm plate-plate configuration (0.2 mm gap, 60 sec, 25° C.), preferably from 7.5 to 35 and more preferably from 10 to 30 Pas (15$^{-1}$).

Preferably, the positive temperature coefficient composition according to the present invention has a thixotropic index from 2 to 15, preferably from 3 to 15 and more preferably from 4 to 9. The thixotropic index is calculated by dividing the viscosity at 1.5 s$^{-1}$ by viscosity at 15 s$^{-1}$.

Figure 2:
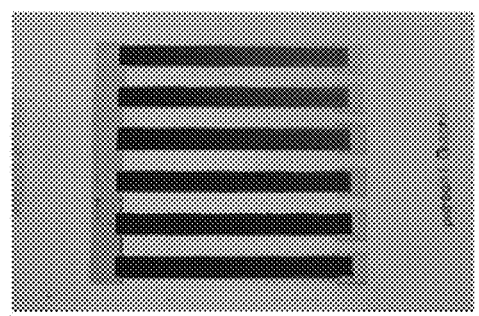
FIG. 2 illustrates the test pattern used in measuring the sheet resistance of the ink.

Preferably, the positive temperature coefficient composition according to the present invention has a resistance from 1 to 2 kΩ/sq/25 µm measured according to the following method. The design Illustrated in FIG. 2 is screen printed and subsequently dried. The average resistance and thickness of the tracks is measured. Resistance is calculated by (R×thickness)/(#squares×25), wherein R is an average track resistance (kOhm), dry thickness (µm), # squares is 5(track length/track width) and 25 is normalisation to 25 µm.

Preferably, the positive temperature coefficient composition according to the present invention has a PTC ratio greater than 6. In preferred embodiment, PTC ratio is as high as possible. PTC ratio is the maximum resistance divided by the resistance at room temperature. A higher PTC ratio provides more safety.

Preferably, the positive temperature coefficient composition according to the present invention has a solid content from 30% to 60%, preferably from 35% to 55% and more preferably from 40% to 50%.

The positive temperature coefficient composition according to the present invention can be in the form of an ink, an adhesive, a film, a laminate, a tape or hotmelt, preferably the composition is in the form of an ink, more preferably in a form of a screen printable ink.

The positive temperature coefficient composition according to the present invention can be prepared in several ways of mixing all ingredients together.

In one embodiment, the preparation of the positive temperature coefficient composition according to the present invention comprises following steps:

1) pre-dissolving the at least one binder into a solvent;
2) adding the micronized semi-crystalline material into the solution of step 1) and mixing with speed mixer till homogenous mixture is formed;
3) adding the electronically conductive material and mixing till homogenous mixture is formed; and
4) triple roll milling.

The positive temperature coefficient composition according to the present invention can be applied onto a substrate by various techniques. Suitable techniques for use herein are for example screen printing, roll printing, roller coating, rotary screen printing and dispensing. Separate curing step is not required and is therefore optional, as the solvent evaporates during drying.

Non-limiting examples of suitable substrates to be used herein are PET, paper, cardboard and FSR boards.

A positive temperature coefficient composition according to the present invention can be used in heating elements and sensors.

The present invention also encompasses an article comprising a positive temperature coefficient composition according to the present invention. The article can be selected from the group consisting of self-controlled heaters; over-current protection devices; air conditioning units; de-icing applications; de-fogging applications; defogging, defreezing, de-icing or snow-removal devices; automotive applications selected from the group consisting of heated seats, heated mirrors, heated windows, heated steering wheels; circuit protection devices; perfume dispensers; sensors.

EXAMPLES

|  | Example 1 | Example 2 | Example 3 | Example 4 (according to the present invention) |
|---|---|---|---|---|
| 20% Estane 5717 in carbitol acetate | 26.28 | 26.28 | 26.28 | 26.28 |
| 10% Elwax 40W in butyl glycol acetate | 19.46 | 19.46 | 19.46 | 19.46 |
| Butyl glycol acetate | 12.18 | 12.18 | 12.18 | 12.18 |
| Ensaco 250 P (carbon black) | 7.64 | 7.64 | 7.64 | 7.64 |
| Carbitol acetate | 2.88 | 2.88 | 2.88 | 2.88 |
| AC (R) 597P (semi-crystalline material) | 31.56 |  |  |  |
| Acuminist C3 (semi-crystalline material) |  | 31.56 |  |  |
| Intelimer IPA 13-6 (semi-crystalline-material) |  |  | 31.56 |  |
| Dilavest P86 (semi-crystalline material) |  |  |  | 31.56 |
| Melt enthalpy (J/g) | 159.1 | 258.8 | 143.3 | 216.9 |
| Viscosity at 15/s (Pas) | 118.8 | 65.4 | 23.9 | 73.9 |
| Viscosity at 1.5/s (Pas) | 486.9 | 303.0 | 135.0 | 638.0 |
| TI | 4.1 | 4.6 | 5.7 | 8.6 |
| PTC ratio (drying 10 min at 140° C.) | 1.8 | 4.6 | 3.3 | 31.3 |

A-C(R)597P from Honeywell International Inc.; Estane 5715 from Lubrizol; Elwax 40W from Du Pont; Ensaco 250P from Timcal; butyl glycol acetate from Eastman; carbitol acetate from Eastman. Acumist C3 from Honeywell International Inc.; Intelimer IPA 13-6 from AirProducts; Dilavest P86 from Paramelt.

All example compositions were prepared as described below.

Two pre-dissolved binder solutions were used: Estane 5715, is a binder which gives the mechanical properties, was first dissolved in butyl glycol acetate and a second binder Elwax 40W was also dissolved in butyl glycol acetate and is being used to give the ink an improved printability. The two binder solutions were mixed together with solvent and the semi-crystalline material in a speed mixer. The mixture was mixed till homogeneous and subsequently the electronically conductive material were added and the formed mixture was mixed till homogeneous. At last, the composition was triple roll milled. If the viscosity was too high, it was adjusted by adding some additional solvent. Desired viscosity depends on the how the PTC composition is applied. For example for the screen printing application the desired viscosity is from 10 to 30 Pas ($15^{-1}$).

Once the positive temperature coefficient composition was ready in an ink form a test pattern (FIG. 2) was printed. The test pattern was printed by using a silver ink and the PTC ink according to the present invention. Both inks were screen printed using 250 mesh stainless steel screens. A conductive silver ink was printed and dried first. The PTC ink tracks were printed on top of the silver ink and also dried.

This test pattern was used to measure the sheet resistance of the ink. Besides that is was used to measure the resistance at different temperatures to determine the PTC curve and maximum PTC ratio.

Figure 3:
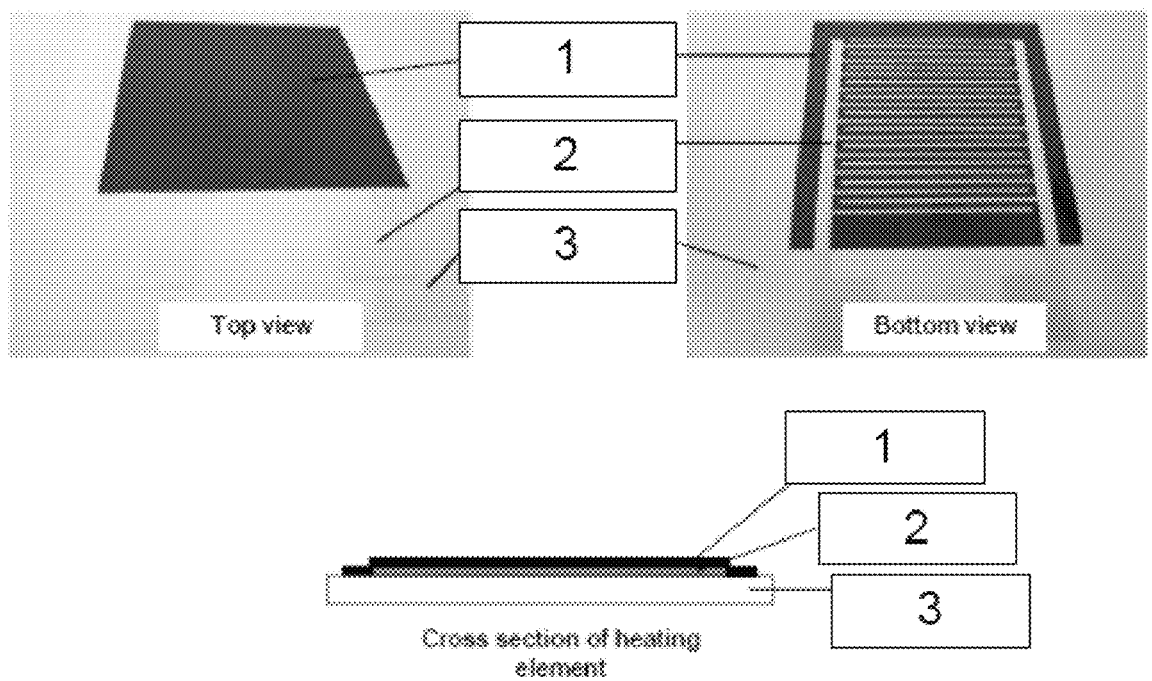
FIG. 3 illustrates the heating element and it's structure.

A heating element (FIG. 3) was used to apply Voltage on the element. 1—PTC ink; 2—Ag ink; 3—PET substrate.

Application of Voltage showed at which temperature the PTC ink gives self-regulation.

Figure 4:
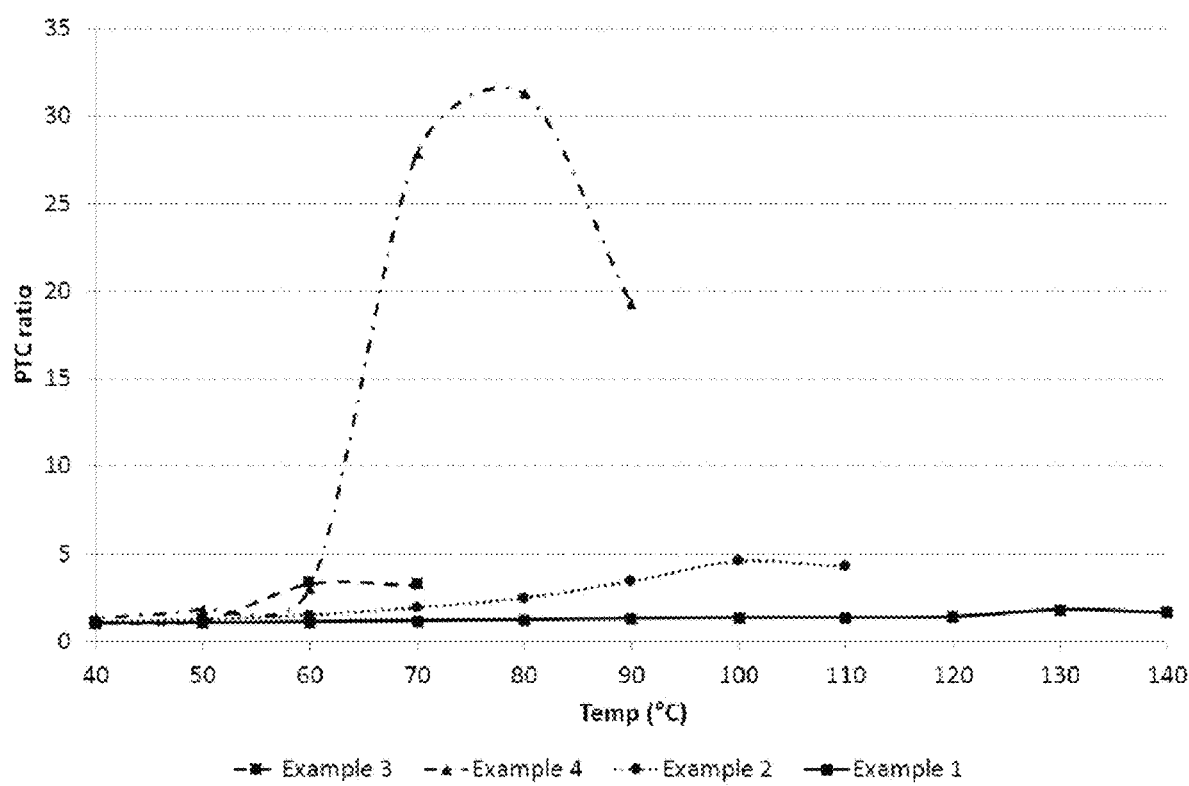
FIG. 4 illustrates the DSC curve of the semi-crystalline material, which was used in the composition of example 1.

In example 1, the semi-crystalline material has a melt enthalpy of 159 J/g and it also has a very broad melt peak. FIG. 4 illustrates DSC curve of the semi-crystalline material used in the composition of example 1. This result in a very shallow curve and almost no PTC effect, which can be seen in FIG. 5.

Figure 5:
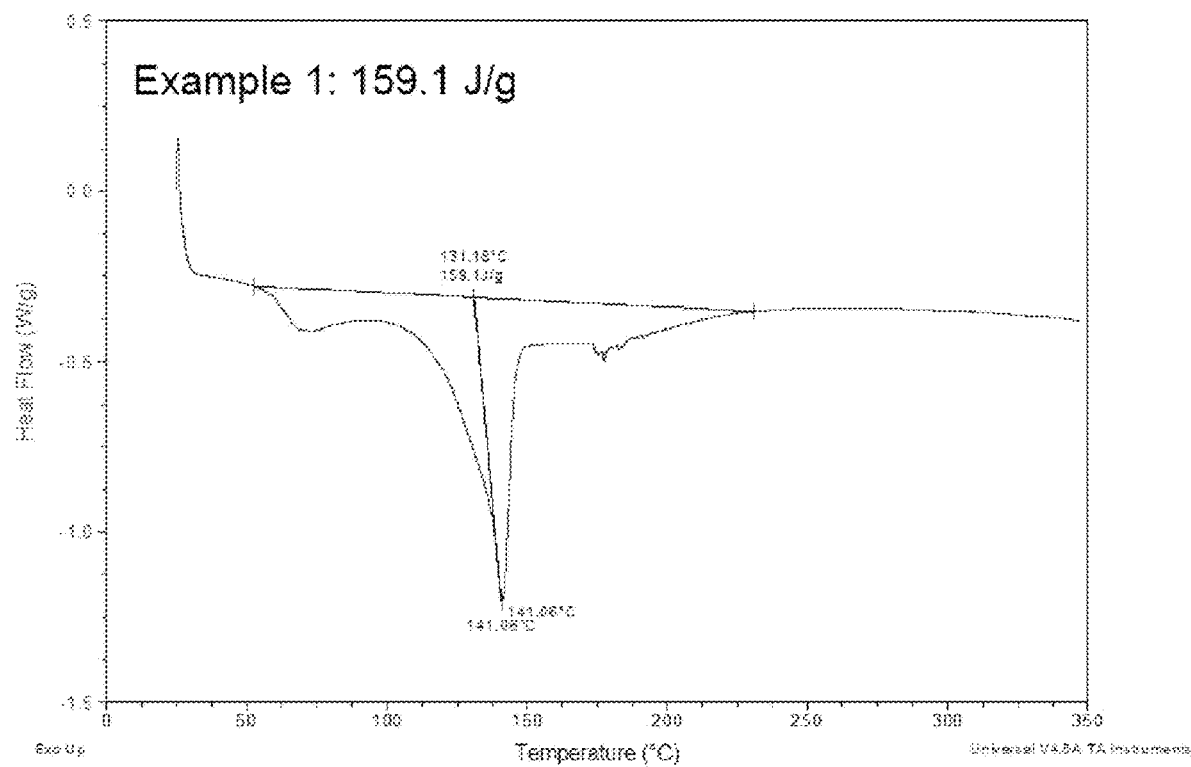
FIG. 5 illustrates the PTC curves for the compositions of examples 1-4.
Figure 6:
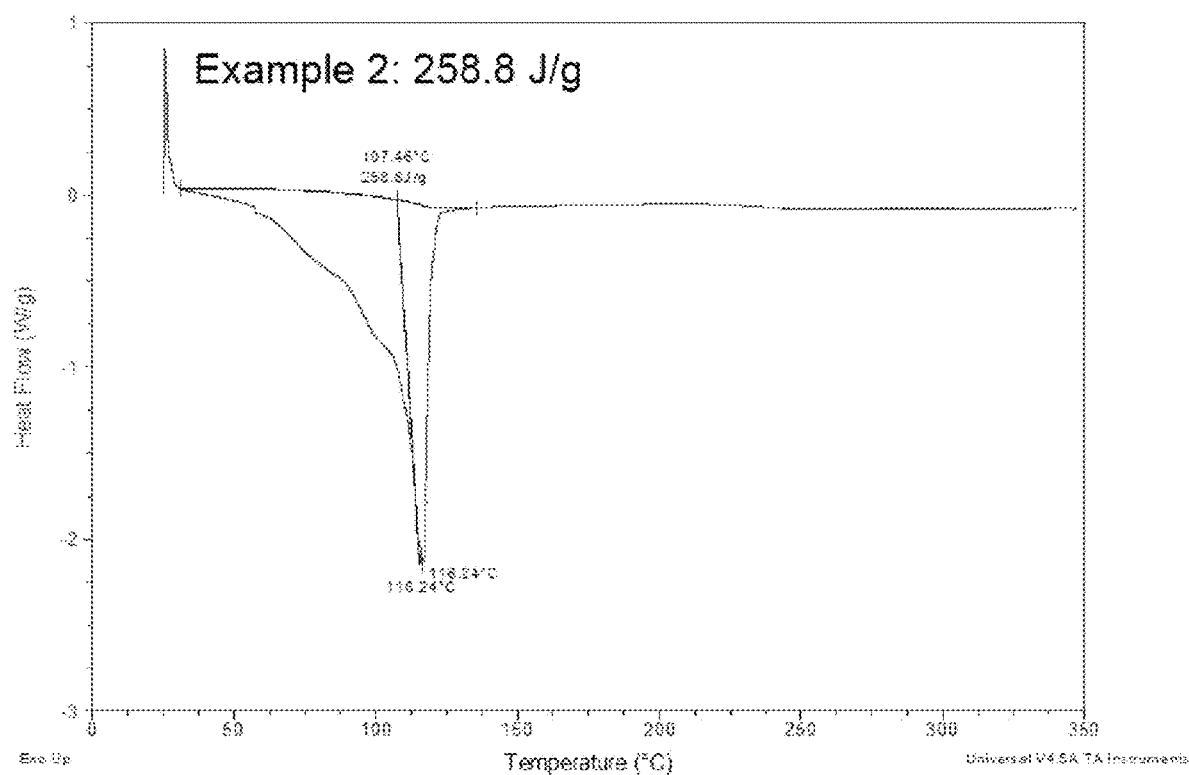
FIG. 6 illustrates the DSC curve of the semi-crystalline material, which was used in the composition of example 2.

In example 2, the melt enthalpy is very high (259 J/g). The melting curve is very broad and it takes a while before the semi-crystalline material melts. FIG. 6 illustrates DSC curve of the semi-crystalline material used in the composition of example 2. It is shown in FIG. 5 that this results in a very broad PTC curve and this means that there is no clear cut off temperature. An increase in voltage will also results in a temperature increase. The PTC curve is not steep enough to prevent a temperature increase.

Figure 7:
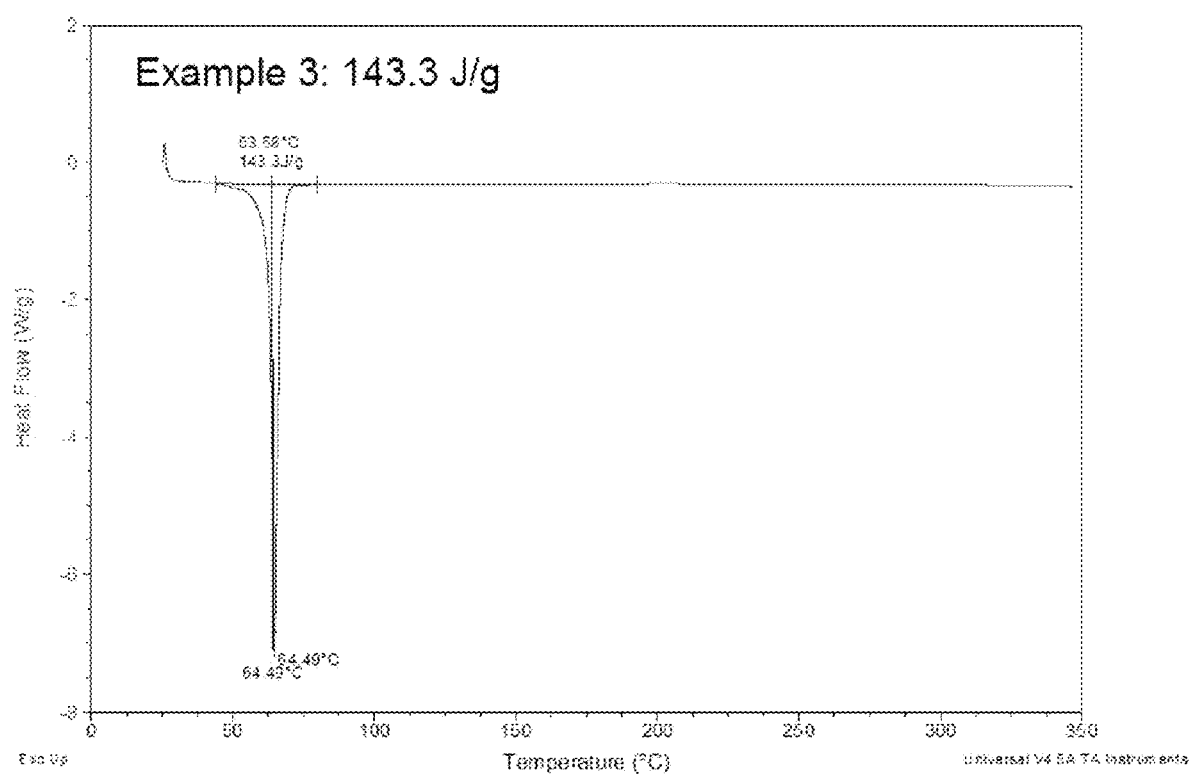
FIG. 7 illustrates the DSC curve of the semi-crystalline material, which was used in the composition of example 3.

In example 3, the melting peak of the semi-crystalline material is very narrow, and this results in a steep resistance increase just before the melting point. Resistance start to increase around 47° C. and reaches a maximum at little over 60° C. The melt enthalpy is 143 J/g. FIG. 7 illustrates DSC curve of the semi-crystalline material used in the composition of example 3. In this case a steep PTC curve is achieved. As can be seen in FIG. 5, the PTC ratio is not so high.

Figure 8:
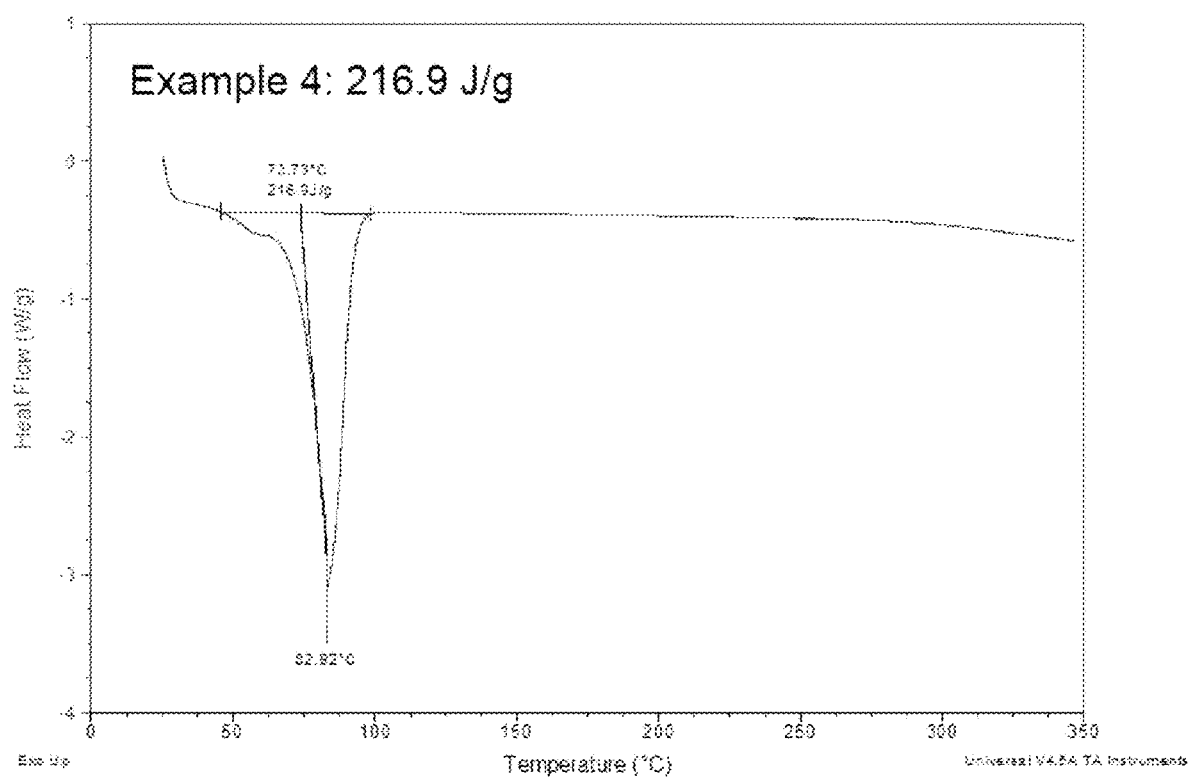
FIG. 8 illustrates the DSC curve of the semi-crystalline material, which was used in the composition of example 4.

In example 4, the positive effects on both sides can be seen. The semi-crystalline material has a high melt entalphy (217 J/g) and relatively narrow melting peak. FIG. 8 illustrates DSC curve of the semi-crystalline material used in the composition of example 4. This results into a flat PTC curve till just before the self-regulation, followed by a steep increase and high PTC ratio, which is a little over 30. The PTC curve is illustrated in FIG. 5.

The examples exemplify the effect of temperature on resistance. The graphs of the example compositions show the effects which can be achieved by the PTC compositions according to the present invention. One curve shows the relation between temperature and resistance for most of the PTC inks according to the prior art: a slow increase of resistance at increasing temperature. The curves for the compositions according to the present invention in FIG. 1, shows the first advantage of the compositions according to the present invention: at the beginning almost no resistance increase, not until a certain point where the resistance increases very quick. This means and indicates rapid heating and a very quick establishment of the self-regulating temperature. The graphs show also the second advantage. Typical PTC composition according to the prior art has a PTC ratio in the range of 10, however, the compositions according to the present invention have very high PTC ratios. This means and indicates that more voltage can be applied without overshooting the safety.

Example 5

Target resistance is about 250 kOhm/sq at 25 μm.

|  | Example 5 (according to the present invention) |
|---|---|
| Estane 5717 | 9.82 |
| Elwax 40W | 1.04 |
| Butyl glycol acetate | 63.12 |
| Special Black 4 | 3.2 |
| Black Pearl 280 | 3.2 |

-continued

|  | Example 5 (according to the present invention) |
| --- | --- |
| PKHJ | 4.92 |
| Intelimer 13-6 | 14.8 |
| PTC ratio (drying 10 min at 140° C.) | 11 |

Estane 5715 from Lubrizol; Elwax 40W from Du Pont; Special Black 4 & Black Pearl 280 from Timcal; butyl glycol acetate from Eastman; Intelimer 13-6 from Air Products and PKHJ from InChemRez.

The composition of example 5 was prepared as described below.

Three pre-dissolved binder solutions were used: Estane 5715 and PKHJ (binders that provide the ink the mechanical properties) were first dissolved in butyl glycol acetate and a binder Elvax 40W (provides the ink an improved printability) was dissolved in butyl glycol acetate. These two binder solutions were mixed together with solvent and the semi-crystalline material in a speed mixer. The mixture was mixed till homogeneous, and subsequently the electronically conductive material was added and the formed mixture was mixed till homogeneous. At last, the composition was triple roll milled. If the viscosity was too high, it was adjusted by adding some additional solvent. Desired viscosity depends on the how the PTC composition is applied. For example for the screen printing application the desired viscosity is from 10 to 30 Pas ($15^{-1}$).

The invention claimed is:

1. A positive temperature coefficient composition comprising:
   a) a semi-crystalline material;
   b) at least one binder;
   c) from 4.5 to 8% by weight of an electronically conductive filler; and
   d) a solvent.

2. The positive temperature coefficient composition according to claim 1, wherein said semi-crystalline material is selected from the group consisting of polyethylene, polypropylene, polyvinyls, nylon, polyethylene terephthalate, polybutylene terephthalate, polyoxymethylene, natural polymers, refined hydrocarbon waxes and mixtures thereof.

3. The positive temperature coefficient composition according to claim 1, wherein said semi-crystalline material has a melt enthalpy greater than 150 J/g, measured according to ASTM E793.

4. The positive temperature coefficient composition according to claim 1, wherein said composition comprises a semi-crystalline material from 0.5 to 70% by weight of the total composition.

5. The positive temperature coefficient composition according to claim 1, wherein said at least one binder is selected from the group consisting of thermoplastic polyurethanes, polyesters, polyacrylates, polysiloxanes, halogenated vinyl polymers, vinylidene polymers, polyamide copolymers, phenoxy resins, polyethers, polyketones, polyvinyl butyral, polyvinyl pyrrolidone, polyacrylates and mixtures thereof.

6. The positive temperature coefficient composition according to claim 1, wherein said composition comprises at least two binders, wherein the first binder is selected from the group consisting of thermoplastic polyurethanes, polyesters, polyacrylates, polysiloxanes, halogenated vinyl polymers, vinylidene polymers, polyamide copolymers, phenoxy resins, polyethers, polyketones, polyvinyl butyral, polyvinyl pyrrolidone, polyacrylates and mixtures thereof, and wherein the second binder is selected from the group consisting of ethylene vinyl acetate polymers, poly vinyl alcohol, ethylene alkyl acrylate copolymers and mixtures thereof.

7. The positive temperature coefficient composition according to claim 1, wherein said composition comprises at least one binder from 0.5 to 8.5% by weight of the total weight of the composition.

8. The positive temperature coefficient composition according to claim 1, wherein said composition comprises at least two binders from 1 to 10% by weight of the total weight of the composition.

9. The positive temperature coefficient composition according to claim 1, wherein said electronically conductive filler is selected from the group consisting of silver, nickel, carbon, carbon black, graphite, graphene, copper, silver coated copper, silver coated graphite, gold, platinum, aluminum, iron, zinc, cobalt, lead, tin alloys and mixtures thereof.

10. The positive temperature coefficient composition according to claim 1, wherein said solvent is selected from the group consisting of ketones, esters, glycol esters, glycol ethers and mixtures thereof.

11. The positive temperature coefficient composition according to claim 1, wherein said composition comprises solvent from 5 to 80% by weight of the total weight of the composition.

12. The positive temperature coefficient composition according to claim 1, wherein said composition is formulated as an ink, an adhesive, a film, a tape or a hotmelt.

13. An article comprising a positive temperature coefficient composition according to claim 1, wherein said article is selected from the group consisting of self-controlled heaters, over-current protection devices, air conditioning units, defogging, defreezing, de-icing devices, and snow-removal devices, or said article is an automotive application selected from the group consisting of heated seats, heated mirrors, heated windows, heated steering wheels, circuit protection devices, perfume dispensers, and sensors.

* * * * *